United States Patent [19]
Jacobson

[11] 4,160,122
[45] Jul. 3, 1979

[54] TELEPHONE EARPHONE AMPLIFIER

[76] Inventor: Sava W. Jacobson, 8130 Orion Ave., Van Nuys, Calif. 91406

[21] Appl. No.: 908,589

[22] Filed: May 23, 1978

[51] Int. Cl.² .............................................. H04M 1/60
[52] U.S. Cl. ................................... 179/1 A; 179/81 B
[58] Field of Search ...................... 179/1 A, 1 R, 81 B, 179/2 B

[56] References Cited

U.S. PATENT DOCUMENTS

| 2,912,502 | 11/1959 | Talcott | 179/81 B |
| 3,041,411 | 6/1962 | Beatty | 179/81 B |
| 3,446,976 | 5/1969 | Shaw | 179/2 B |

FOREIGN PATENT DOCUMENTS

| 216267 | 3/1958 | Australia | 179/81 B |
| 44-18804 | 8/1969 | Japan | 179/81 B |

Primary Examiner—Kathleen H. Claffy
Assistant Examiner—Kenneth A. Chayt
Attorney, Agent, or Firm—Spensley, Horn, Jubas & Lubitz

[57] ABSTRACT

This telephone earphone amplifier is turned on automatically when the telephone handset is taken off-hook. To this end, the dc bias provided to the microphone from the telephone line is used to turn on a semiconductor switch that connects dc power to the amplifier. The amplifier itself is connected to amplify the incoming audio, so as to provide greater volume e.g., to aid persons of impaired hearing.

7 Claims, 2 Drawing Figures

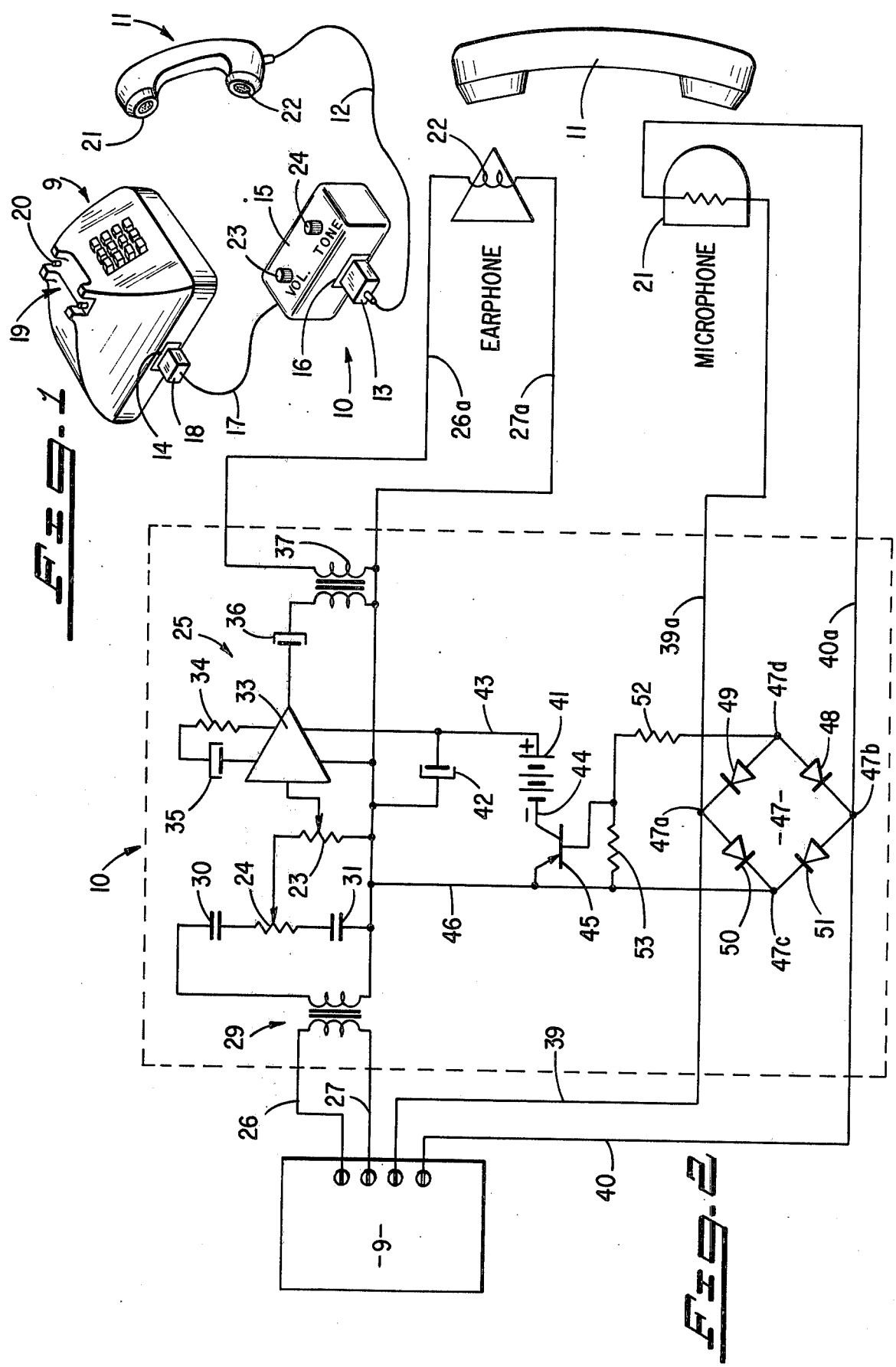

TELEPHONE EARPHONE AMPLIFIER

BACKGROUND OF THE INVENTION

1. Field of the Invention

The present invention relates to an earphone amplifier system for a telephone and particularly to an earphone amplifier which is turned on automatically when the handset is taken off-hook.

2. Description of the Prior Art

For the hard of hearing, the normal volume level in a telephone receiver may not be loud enough to be heard comfortably or at all. This problem of insufficient telephone volume is particularly acute for elderly or infirm persons who may depend on the telephone to summon aid in an emergency, and to overcome loneliness by communicating with relatives and friends. Auxiliary amplification of the incoming audio can solve this problem, and thereby make use of the telephone more accessible to, or more comfortable for such persons.

Telephone earphone amplifiers are known per se. They function to amplify the incoming audio signal to a level sufficient to be heard comfortably by the hard of hearing, or to amplify a particularly weak signal to a level that is comfortable for a person with normal hearing. To make such an amplifier widely available, it is important that its cost be low, and that its installation be simple and inexpensive. A principal object of the present invention is to provide such an amplification system.

Battery powered amplifiers may be low in cost, but have the requirement that the power must be switched on and off each time the telephone is used. A simple manually operated switch may be provided for this purpose. However, this requires that the switch be turned on each time the telephone is used, and turned off at the end of each conversation. If the user forgets to turn off the switch, the amplifier will remain on, draining down the battery, perhaps to the point where no power is left to operate the amplifier when the telephone next must be used. With such an arrangement, there may be no warning given to the user that the power switch has been left on at the end of the conversation. If such a warning signal were provided, the signalling mechanism itself may place an unnecessary drain on the battery thereby shortening its usable lifetime.

An alternative is to utilize a mechanical switch that is operated when the handset is removed from the cradle. Such a mechanism would ensure turn-off of the amplifier when the handset is replaced at the end of a call. However, such a mechanism is cumbersome, and may be unsightly and/or expensive.

A further object of the present invention is to provide an earphone amplifier system in which power to the amplifier automatically is turned on only for the duration of each call. No mechanical switch is employed, thereby eliminating the need for the user manually to turn off the amplifier, and eliminating the need for a mechanism to actuate the switch when the handset is taken from its cradle.

Another desirable feature for a telephone earphone amplifier is that its installation be simple and inexpensive. An object of the present invention is to facilitate such simple installation. In telephone instruments in which the handset is connected by a jack and plug arrangement, one embodiment of the present invention permits installation merely by removing the handset plug from the telephone instrument, plugging it instead into an adapter unit containing the invention, and plugging that unit into the telephone instrument. Alternatively, the present invention may be installed merely by connecting four wires in circuit with the telephone handset.

SUMMARY OF THE INVENTION

These and other objectives are achieved by providing a telephone earphone amplifier which is automatically turned on during the off-hook condition. To accomplish this, the system utilizes the dc bias voltage provided to the telephone microphone to actuate a semiconductor switch that connects power to the ampliifer.

In a preferred embodiment, the present invention utilizes a diode bridge connected across the telephone microphone. When the handset is lifted from the associated telephone instrument, the normal cradle switch connects the microphone to the telephone line. The dc bias voltage supplied from the line to the microphone passes through the bridge and is used to turn on a semiconductor switch that is part of the present invention. This switch in turn connects a battery or other source of dc power to an amplifier connected in circuit with the handset earphone. In this manner, the amplifier automatically is turned on only so long as the handset is held off the cradle. In other words, the amplifier will be turned on and off automatically at the beginning and end of each call.

BRIEF DESCRIPTION OF THE DRAWINGS

A detailed description of the invention will be made with reference to the accompanying drawings, wherein like numerals indicate corresponding elements in the several figures.

FIG. 1 is a pictorial view of a telephone provided with the inventive earphone amplifier system.

FIG. 2 is an electrical schematic diagram of the inventive earphone amplifier system.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention, since the scope of the invention best is defined by the appended claims.

Referring to FIG. 1, there is shown a conventional telephone instrument 9 provided with an earphone amplifier system 10 in accordance with the present invention. In this embodiment, the telephone handset 11 normally is connected to the instrument 9 via a cord 12 and a plug 13 which is received by a jack 14 on the instrument 9. The inventive amplifier system 10 advantageously is contained in a housing 15 provided with a jack 16 which receives the plug 13 from the handset 11. Connection is made to the instrument 9 via a short cable 17 and a plug 18 which is inserted into the jack 14 in place of the plug 13. This arrangement facilitates all of the requisite electrical connections to the amplifier system 10.

There is no mechanical on/off switch for the amplifier system 10. Rather, when the handset 11 is removed from the instrument cradle 19, the normal cradle switch 20 completes the electrical circuit to the handset 11. The resultant flow of dc bias voltage to the handset microphone 21 automatically actuates the amplifier system 10. Audio amplification thereby is provided for incoming signals so as to increase the loudness of the sound produced by the handset earphone 22. Controls 23 and 24 are provided respectively to permit adjustment of the volume and tone of the received audio.

Referring to FIG. 2, audio amplification is provided by an amplifier circuit 25 which is interposed in the pair of lines 26, 27 which normally connect the telephone instrument 9 to the handset earphone 22.

The primary of an isolation transformer 29 is connected across the lines 26 and 27. The secondary of this transformer 29, which may be of the step-up type, is connected across a tone control network including a pair of capacitors 30, 31 and a variable resistor 24. This network in turn is connected via the volume control potentiometer 23 to the input of an amplifier 33. This amplifier 33 may be implemented using a conventional integrated circuit such as a type LM386 and an associated resistor 34 and capacitor 35. The amplifier 33 output is supplied via a coupling capacitor 36, an isolation transformer 37 which may be of the step-down type, and a pair of lines 26a, 27a to the earphone 22. The circuit 25 thus functions to amplify audio coming in from the telephone line for application at an increased level to the earphone 22.

The handset microphone 21 normally is connected to the telephone instrument 9 via a pair of lines 39 and 40. These lines remain directly connected to the microphone 21 via the amplifier system 10 and a pair of lines 39a, 40a.

The amplifier circuit 25 is powered by a battery 41 or other source of dc power, which is filtered by a capacitor 42. The positive terminal of the battery 41 is connected via a line 43 to the amplifier 33. The negative terminal of the battery 41 is connected via a line 44 and a transistor 45 to the common line 46 of the amplifier circuit 25. In this manner, power is supplied to the circuit 25 only when the transistor 45 is on. That is, the transistor 45 functions as a power switch for the amplifier circuit 25.

In accordance with the present invention, the transistor switch 45 is actuated by the dc bias supplied from the telephone line to the microphone 21. Typically, a dc voltage in the range of 2 to 3 volts is supplied to the microphone 21 via the lines 39, 40 whenever the handset 11 is removed from the cradle 19 (FIG. 1) so as to close the cradle switch 20. This voltage biases the carbon granules in the microphone 21. When the user speaks into the microphone 21, the resultant audio voltage (typically at a 1 volt peak level) is superimposed on the dc bias, which remains present across the lines 39 and 40.

A diode bridge 47, consisting of four diodes 48–51, has its input nodes 47a, 47b connected across the microphone lines 39, 40. The bridge output nodes 47c, 47d are appropriately connected so as to control the transistor switch 45.

To this end, the node 47c is connected to the emitter of the PNP transistor 45, and the node 47d is connected via an isolation resistor 52 to the base of the transmitter 45. Thus whenever the microphone dc bias is present across the lines 39, 40 a corresponding voltage will be supplied across the emitter and base of the transistor 45 to turn it on, thereby connecting power from the battery 41 to the amplifier circuit 25. By using a bridge 47, the correct polarity turn-on voltage always will be supplied to the transistor 45 regardless of the polarity of the bias voltage across the lines 39 and 40. In other words, the voltage at the bridge node 47d, and hence at the base of the PNP transistor 45 always will be negative with respect to the voltage at the emitter, as supplied from the node 47c. This arrangement simplifies installation of the system 10, since there is no requirement to ensure correct polarity attachment to the microphone lines 39, 40.

At the end of a call, when the handset 11 is replaced on the cradle 19, the switch 20 will be opened so as to terminate the dc bias on the lines 39, 40. As a result, the transistor 45 will turn off, thereby disconnecting power from the amplifier circuit 25. Full turn-off of the transistor 45 may be ensured by a resistor 53 connected between the emitter and base thereof. This resistor will eliminate any leakage current from emitter to collector in the absence of a control voltage. from the bridge 47, and thereby ensure full turn-off of the transistor 45.

The invention is not limited to use of an PNP transistor 45 as the switching element. An NPN transistor may be used, with appropriate polarity connections to the dc source 41 and to the bridge 47. Furthermore, a diode bridge 47 need not be used at all; rather, the lines 39 and 40 may be connected directly to provide the control signal to the switching transistor 45. However, in that case, care must be taken to ensure that the correct polarity connections are made to the microphone lines. Furthermore, the switching element need not be a transistor. Other semiconductor switch devices may be employed.

Nor is the invention limited to use with a telephone of the type wherein the handset cord 12 is provided with a plug 13, as shown in FIG. 1. The invention may be used with a handset having other types of terminal connections, so long as the electrical interconnections are equivalent to those shown in FIG. 2.

I claim:

1. For use with a telephone instrument of the type having a handset with an earphone and a microphone, an earphone amplifier system comprising:
    an amplifier connectable in circuit with said earphone to amplify the audio signal going to said earphone,
    a source of power for said amplifier, and
    switch means, actuated by the dc bias supplied to said microphone from the telephone line when the handset is taken off-hook, for connecting said source of power to said amplifier so long as said handset is off-hook.

2. A telephone earphone amplifier system according to claim 1 wherein said switch means comprises:
    a semiconductor switch connected in circuit between said source of power and said amplifier,
    biasing means for utilizing said microphone dc bias to turn ON said switch, power from said source thereby being supplied to said amplifier via said turned-on switch.

3. A telephone earphone amplifier system according to claim 2 wherein said biasing means comprises:
    a rectifier bridge having its input nodes connected across said microphone and its output nodes operatively connected to the control electrode of said semiconductor switch.

4. A telephone earphone amplifier system according to claim 3 wherein said semiconductor switch is a transistor and wherein the output nodes of said rectifier bridge are connected across the emitter and base of said transistor.

5. A telephone earphone amplifier system according to claim 4 wherein said transistor is a PNP transistor, together with a resistor connected between the emitter and base of said transistor to eliminate leakage current therethrough.

6. A telephone earphone amplifier system according to claim 2 wherein said handset normally is connected to the associated telephone instrument by a mating handset plug and instrument jack, said system having an adapter jack into which the handset plug is insertable instead of into the instrument jack, and having an adapter plug that is insertable into the instrument jack in place of the handset plug, said amplifier being connected between the earphone line terminals of said adapter plug and adapter jack, the microphone line terminals of said adapter plug being directly connected to the microphone line terminals of said adapter jack, said bridge rectifier nodes being connected across said microphone line direct connections.

7. An automatic turn-ON battery powered incoming audio amplifier for the earpiece transducer of a telephone instrument, comprising:

an amplifier connectable in the line to said earpiece transducer, a battery, a semiconductor switch connected in circuit between said battery and said amplifier so that turn-ON of said switch will connect power from said battery to said amplifier, and a rectifier bridge, the input nodes of said bridge being electrically connectable across the mouthpiece transducer of said telephone instrument, the output nodes of said rectifier bridge being operatively connected to the control element of said semiconductor switch so that the dc bias provided to said mouthpiece transducer from the telephone line when said instrument is off-hook will be supplied via said bridge to said control element to turn ON said switch and thereby connect power to said amplifier for amplification of incoming audio.

* * * * *